United States Patent [19]

Matsui et al.

[11] Patent Number: 4,538,562
[45] Date of Patent: Sep. 3, 1985

[54] ENGINE PART

[75] Inventors: Minoru Matsui, Nagoya; Nobuo Tsuno, Kasugai, both of Japan

[73] Assignee: NGK Insulators, Ltd., Japan

[21] Appl. No.: 492,255

[22] Filed: May 6, 1983

[30] Foreign Application Priority Data

Dec. 3, 1982 [JP] Japan .............................. 57-211385

[51] Int. Cl.$^3$ .............................................. F01L 1/14
[52] U.S. Cl. .................................. 123/90.51; 123/669;
92/212; 428/594; 428/633; 428/681
[58] Field of Search ............... 428/632, 633, 610, 614,
428/594, 678-681, 621; 123/90.48, 193 P, 668,
669, 90.51; 92/212, 213; 501/103, 104

[56] References Cited

U.S. PATENT DOCUMENTS

| | | | |
|---|---|---|---|
| 2,657,961 | 11/1953 | von Lassberg | 123/193 P |
| 2,857,663 | 10/1958 | Beggs | 428/632 |
| 3,265,473 | 8/1966 | Gallet | 428/632 |
| 3,340,025 | 9/1967 | Milch et al. | 428/633 |
| 3,666,429 | 5/1972 | Campbell, Jr. et al. | 428/633 |
| 3,762,389 | 10/1973 | Malina | 123/193 P |
| 3,911,891 | 10/1975 | Dowell | 92/213 |
| 4,075,364 | 2/1978 | Panzera | 428/610 |
| 4,137,887 | 2/1979 | Dunn | 123/193 P |
| 4,140,096 | 2/1979 | Dunn et al. | 123/193 P |
| 4,242,948 | 1/1981 | Stang et al. | 123/193 P |
| 4,254,621 | 3/1981 | Nagumo | 123/193 P |
| 4,269,903 | 5/1981 | Clingman et al. | 428/633 |
| 4,306,489 | 12/1981 | Driver et al. | 123/193 P |
| 4,335,190 | 6/1982 | Bill et al. | 428/633 |
| 4,404,935 | 9/1983 | Kraft | 123/193 P |

FOREIGN PATENT DOCUMENTS 2061383  5/1981  United Kingdom ............... 123/668

Primary Examiner—Melvyn J. Andrews
Assistant Examiner—Robert L. McDowell
Attorney, Agent, or Firm—Parkhurst & Oliff

[57] ABSTRACT

The disclosed engine part uses an integral combination of a ceramic member and a metallic member, which ceramic member has a metallized layer formed on one side surface thereof, and a metallic buffer is bonded to the metallized layer so as to be disposed between the ceramic member and the metallic member.

15 Claims, 6 Drawing Figures

ENGINE PART

BACKGROUND OF THE INVENTION

1. Field of the Invention

This invention relates to an engine part, and more particularly to an engine part made of a combination of a ceramic member and a metallic member.

2. Description of the Prior Art

To improve the thermal efficiency of engines and improve the service life of various engine parts, it is effective to use an engine part which is made of a composite combination of a ceramic member and a metallic member, because such composite engine parts have a high heat insulation and a high wear resistance.

As an example of the engine part for improving the thermal efficiency of engines, a heat-insulating type piston utilizing ceramics has been contemplated. Two different structures for the piston utilizing ceramics have been proposed; namely, a structure made of a ceramic piston crown fastened to a piston body by using a metallic bolt, and a structure made by casting a metallic piston skirt on the outer circumferential surface of a ceramic piston crown.

In the case of the structure made of a ceramic crown fastened to a piston body by a metallic bolt, as disclosed in the specification of U.S. Pat. No. 4,242,948, the heat insulation of the piston is insufficient because the heat leaks to the piston skirt through the metallic bolt. Due to the need of the heat-resistance, the material of the bolt is generally different from that of the piston skirt, and the fastening at the bolt tends to be loosened by repetition of thermal expansions and shrinkages caused by the difference of thermal expansion between the bolt and the piston skirt. Besides, this type of structure has a shortcoming in that highly sophisticated machining techniques are necessary for boring a bolt hole in the ceramic piston crown.

In the case of the structure made by casting a metallic piston skirt on the outer circumferential surface of a ceramic piston crown, the coefficient of thermal expansion of the ceramic material of the piston crown is smaller than that of aluminum alloys or spheroidal graphite cast iron which are generally used for casting the piston skirt, so that the structure has a shortcoming in that the ceramics are susceptible to cracking due to the shrinkage of the cast metal during and after the cooling. To solve this shortcoming, U.S. Pat. No. 4,245,611 proposed a structure in which cushion layer made of fibrous ceramic material was disposed between the ceramic piston crown and the cast metal. Japanese Patent Laid-open Publication No. 122,659/81 proposed a structure in which a metallic ring is shrink fitted on the outer circumferential surface of the ceramics piston and a piston skirt is cast on the outer circumferential surface of the thus fitted metallic ring. However, the structure using the fibrous ceramic cushion layer has a shortcoming in that the bond between the piston crown and the piston skirt tends to be insufficient so that the piston crown is apt to be loosened during the operation of the piston. The structure using the metallic ring shrink fitted to the ceramic piston crown has a shortcoming in that high precision is required in the machining of the ceramic piston crown and the metallic ring.

Additionally, WIPO Publication No. 82/01034 proposes a tappet having a cam contact surface made of ceramics, for the purpose of improving the wear-resistance of engine parts. The tappet thus proposed has a shortcoming in that the ceramic member for the cam contact surface is shrink fitted on the tappet body, and high precision is required in the machining of the ceramic and metallic members thereof.

SUMMARY OF THE INVENTION

Therefore, an object of the present invention is to obviate the above-mentioned shortcoming of the composite ceramic-metal engine part of the prior art by providing an improved engine part.

Another object of the invention is to provide an engine part having an excellent heat-insulation and an excellent wear-resistance, which engine part is easy to produce.

A preferred embodiment of the engine part according to the present invention comprises a ceramic member having a metallized layer formed on the bottom surface thereof, a metallic buffer bonded to the metallized layer, and a metalic member integrally joined to the ceramic member with the metallic buffer disposed therebetween.

What is meant by the metallized layer here is a metallic layer deposited on the surface of a ceramic member for the purpose of metallizing the ceramic surface, which metallized layer is for instance made by applying a paste-like composition consisting essentially of metallic powder particles on the ceramic surface, drying the applied composition, and heating the dried composition in a reducing atmosphere, a non-oxidizing atmosphere, or a hydrogen atmosphere with an adjusted water-vapour partial pressure.

BRIEF DESCRIPTION OF THE DRAWINGS

For a better understanding of the invention, reference is made to the accompanying drawings, in which.

Throughout different views of the drawings, 1 is a piston crown, 2 is a metallized layer, 3 is a metallic buffer, 4 is a junction between the metallized layer and the metallic buffer, 5 is a junction between the metallic buffer and a piston skirt, 6 is a piston skirt, 6A is a bore perforated through top wall of piston skirt, 7 is boundary in the crown 1 around the metallic buffer 3, 8 is a heat-insulating material sheet, 9 is a bolt, 10 is a nut, 11 is a junction between the metallic buffer and the bolt, 12 is a cam contact surface, 13 is a tappet body, and 14 is a junction between the metallic buffer and the tappet body.

DESCRIPTION OF THE PREFERRED EMBODIMENTS

Figure 1:
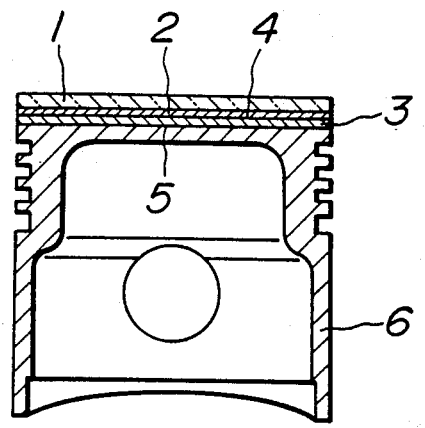
FIG. 1 is a schematic vertical sectional view of an engine piston of heat-insulating type, as an example of the engine part according to the present invention.

In an engine piston of heat-insulating type of FIG. 1, which is an example of the engine part of the present invention, a disk-shaped ceramic piston crown 1 has a metallized layer 2 deposited on the bottom surface thereof and a metallic buffer 3 is bonded to the metallized layer 2 while defining a junction 4 between the metallized layer 2 and the metallic buffer 3. Another junction 5 is defined between the metallic buffer 3 and a metallic piston skirt 6, so that the ceramic piston crown 1 is integrally joined to the metallic piston skirt 6 by the above-mentioned junctions 4 and 5. Preferably, the material of the metallic buffer 3 is different from that of the metallic piston skirt 6.

The ceramics forming the ceramic piston crown 1 preferably have a low heat conductivity, a high mechanical strength, a high heat resistance, and a high corrosion-resistance, and the coefficient of thermal expansion of the ceramics is preferably close to that of the metal forming the metallic piston skirt 6. Examples of such ceramics are alumina ceramics, silicon carbide ceramics, zirconia ceramics, silicon nitride ceramics, and the like. Actual ceramics to be used in the ceramic piston crown 1 are selected depending on the metal which forms the metallic piston skirt 6.

If a zirconia ceramic is used to make the piston crown 1, the material of the coacting metallic piston skirt 6 is preferably cast iron, more preferably spheroidal graphite cast iron, because the coefficient of thermal expansion of such cast iron is close to that of zirconia ceramics. In this case, partially stabilized zirconia ceramics containing magnesia (MgO) or yttria ($Y_2O_3$) is suitable for the ceramics piston crown 1. Further, partially stabilized zirconia ceramics containing yttria are very strong and tough, so that it is one of the most preferable materials for the ceramics piston crown.

The material of the metallized layer 2 to be formed on the bottom surface of the ceramic piston crown 1 mainly consists of one or more of molybdenum (Mo), tungsten (W), iron (Fe), nickel (Ni), copper (Cu), or the like metal. Especially, a metallized layer mainly consisting of molybdenum (Mo) is preferable. In the case of the zirconia ceramics piston crown 1 containing yttria ($Y_2O_3$), a metallized layer consisting of 70–90% by weight of molybdenum (Mo), 0.5–15% by weight of manganese oxide (MnO), 0.1–10% by weight of ytrria ($Y_2O_3$), 0.1–15% by weight of alumina ($Al_2O_3$), 0.1–15% by weight of silica (SiO), up to 10% by weight of zirconia ($ZrO_2$) is preferable because such metallized layer produces a strong bond with the zirconia ceramics surface.

The metallic buffer 3 to be bonded to the metallized layer 2 at the bottom of the ceramic piston crown 1 is preferably made of a buffer metal having a coefficient of thermal expansion of less than $14 \times 10^{-6}$ (°C.$^{-1}$), such as ferritic stainless steel, iron-chromium (Fe—Cr) alloys, iron-chromium-nickel (Fe—Cr—Ni) alloys, iron-nickel (Fe—Ni) alloys, iron-nickel-cobalt (Fe—Ni—Co) alloys, titanium (Ti), titanium alloys, or the like. In short, preferable buffering metal for the metallic buffer 3 should have a coefficient of thermal expansion which is equivalent to or smaller than that of the ceramic piston crown 1.

When the coefficient of thermal expansion of the metallic buffer 3 is smaller than that of the ceramics forming the ceramic piston crown 1, the radial shrinkage of the metallic buffer 3 during the cooling from the high temperature for the bonding thereof onto the metallized layer 2 at the bottom surface of the ceramics piston crown 1 to room temperature is smaller than the radial shrinkage of the ceramics piston crown 1, and a compressive thermal stress is caused in the peripheral edge portion of the ceramic piston crown 1. However, the ceramics have a high strength against the compressive stress, so that no breakage occurs. On the other hand, if the coefficient of thermal expansion of the metallic buffer 3 is larger than that of the ceramics forming the ceramics piston crown 1, tensile stress is caused in the peripheral edge portion of the ceramic piston crown 1, so that such a large coefficient of thermal expansion of the metallic buffer 3 is not desirable. The magnitude of the tensile stress depends on various factors, such as the difference between the coefficient of thermal expansion of the metallic buffer 3 and the ceramics forming the ceramic piston crown 1, the difference between the temperature for the bonding operation and room temperature, the modulus of elasticity of the ceramic, the diameter of the junction between the metallic buffer 3 and the metallized layer 2. Whether the ceramic piston crown 1 is fractured by such tensile thermal stress or not depends on the tensile strength of the ceramics in question.

More specifically, if the above-mentioned tensile thermal stress $\sigma_t$ is smaller than the tensile strength $\sigma_c$ of the ceramics ($\sigma_c > \sigma_t$), the ceramics will not fracture.

Thus, "the coefficient of thermal expansion of the metallic buffer 3 is equivalent to that of the ceramics which forms the ceramic piston crown 1" in the present specification represents two cases; namely, a first case in which their coefficients of thermal expansion are the same and no thermal stress is caused, and a second case in which the coefficient of thermal expansion of the buffering metal is larger than that of the ceramic but the thermal stress caused in the peripheral edge portion of the ceramic piston crown 1 by the difference of the coefficients of thermal expansion is smaller than the tensile strength of the ceramics.

If, however, the coefficient of thermal expansion of the buffering metal is larger than $14 \times 10^{-6}$ (°C.$^{-1}$), the ceramic piston crown 1 is often broken, so that such a large coefficient of thermal expansion of the buffering metal is not desirable.

The bond between the metallized layer 2 and the metallic buffer 3 can be formed either by brazing or by diffusion bonding. The kind of the brazing metal and the insert metal for the diffusion bonding are selected based on the type of the metallic buffer 3 and the high-temperature strength and other mechanical properties required on the junction between the metallized layer 2 and the metallic buffer 3.

To produce a strong junction or bond between the metallized layer 2 and the metallic buffer 3, it is preferable to metal plate one or both of those surfaces of the metallized layer 2 and the metallic buffer 3 which are to be bonded, prior to the formation of the junction therebetween. Generally speaking, metal plating of the metallized layer 2 alone is more preferable than metal plating of both of the above-mentioned surfaces. The kind of the metal to be placed is selected depending on the kind of the materials of the metallized layer 2, the metallic buffer 3, the brazing metal being used, and the type of the junction to be formed, while considering such factors as the prevention of the formation of weak intermetallic compounds, wettability of the plated metal with the brazing metal, and the easiness of mutual diffusion between the metals in contact with each other.

The junction between the metallic buffer 3 and the piston skirt 6 is formed by selecting a suitable method such as brazing, diffusion bonding, welding, bolting, or insert casting. The selection of the method depends on various factors, such as the type, shape, and operating conditions of the piston, and the kind of the metal which forms the piston skirt 6. In the case of the piston skirt 6 made of aluminum alloy having a low melting point and a large coefficient of thermal expansion, it is preferable to bond the piston skirt 6 with the metallic buffer 3 by diffusion bonding, insert casting, or bolting. In connecting the piston crown 1 to the piston skirt 6, the junction between the metallized layer 2 and the metallic buffer 3 and the juntion between the metallic buffer 3 and the piston skirt 6 can be formed either simultaneously or separately, depending on the structure of the junctions and the melting point of the brazing metal being used.

Figure 2:
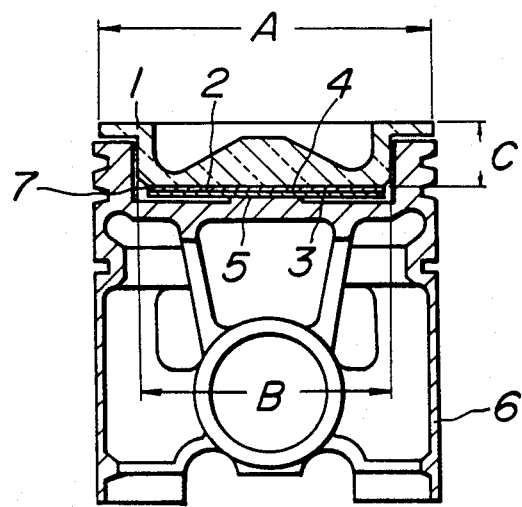
FIGS. 2, 3, 4 and 5 are schematic vertical sectional views of other engine pistons embodying the present invention.

FIG. 2 shows another embodiment of the invention, which is a heat-insulating piston for Diesel engines. A piston crown 1 of this embodiment has a recess on the top surface thereof and a metallized layer 2 on the bottom surface thereof. A piston skirt 6 is bonded to the piston crown 1 with a metallic buffer 3 inserted therebetween in such a manner that the area of a junction 4 between the metallized layer 2 and the metallic buffer 3 is larger than the area of a junction 5 between the metallic buffer 3 and the piston skirt 6. When the diameter of the piston is small, the area of the junction 4 between the metallized layer 2 and the metallic buffer 3 can be the same as that of the junction 5 between the metallic buffer 3 and the piston skirt 6. On the other hand, if the diameter of the piston is large, the difference of shrinkage between the piston crown 1 and the piston skirt 6 during cooling after the bonding operation thereof is large, and sometimes the ceramic piston crown 1 is cracked by the difference of the shrinkages. To avoid such cracking, it is preferable to make the area of the junction 5 between the metallic buffer 3 and the piston skirt 6 smaller than that of the junction 4 between the metallic buffer 3 and the metallized layer 2 of the ceramic piston crown 1.

In the embodiment of FIG. 2, it is preferable to form the metallic buffer 3 with a buffering metal having a coefficient of thermal expansion which is close to that of the ceramic forming the ceramics piston crown 1, because, during the cooling after the bonding of the piston skirt 6 to the piston crown 1, the thus formed metallic buffer 3 results in a small residual thermal stress in the ceramic piston crown 1, at the boundary 7 around and the metallic buffer 3. To limit the residual thermal stress of the ceramic piston crown 1 at its boundary 7 with the junction 4 between the metallized layer 2 and the metallic buffer 3, to either a tensile stress smaller than the tensile strength of the ceramics forming the ceramics piston crown 1 or to a compressive stress, it is preferable to form the metallic buffer 3 with a material having a coefficient of thermal expansion which is equivalent to or smaller than that of the ceramic forming the ceramics piston crown 1.

Figure 3:
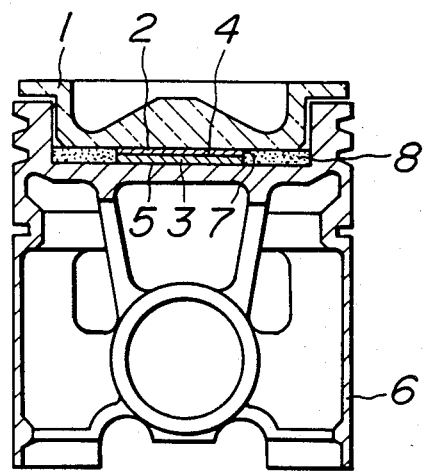

FIG. 3 shows another heat-insulating engine piston according to the present invention, in which a metallized layer 2 is formed at the bottom surface of a ceramic piston crown 1, and a metallic piston skirt 6 is bonded to the piston crown 1 with a metallic buffer 3 inserted therebetween. The diameter of the metallic buffer 3 is smaller than the diameter of the bottom surface of the piston crown 1. A junction 4 is formed between the metallized layer 2 and the metallic buffer 3, and another junction 5 is formed between the metallic buffer 3 and the metallic piston skirt 6. The size of the metallic buffer 3 is determined in such a manner that the mechanical strengths of the junctions 4 and 5 are large enough to withstand any forces acting thereon when the piston is operated in an engine. To enhance the heat insulation, a heat-insulating material sheet 8 may be stuffed into a space around the metallic buffer 3, as shown in the figure.

Figure 4:
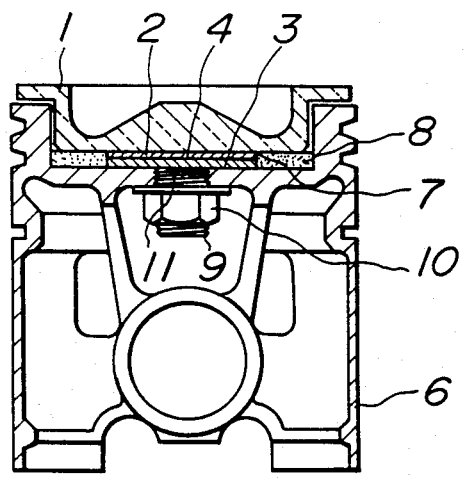

FIG. 4 shows a Diesel engine piston as another embodiment of the present invention. A ceramic piston crown 1 of this embodiment has a metallized layer 2 formed at the bottom surface thereof, and a bolt 9 is connected to the piston crown 1 with a metallic buffer 3 inserted therebetween. A junction 4 is formed between the metallized layer 2 and the metallic buffer 3, while another junction 11 is formed between the metallic buffer 3 and the bolt 9. A piston skirt 6 is joined to the piston crown 1 by the bolt 9 and a nut 10 meshing the bolt 9. The bolt 9 can be made either by using the same material as that of the metallic buffer 3 so as to make them as an integral member, or by using a metal whose coefficient of thermal expansion is similar to that of the piston skirt 6. To avoid loosening of the bolt 9 and the nut 10, it is preferable to form the bolt 9 with the same material as that of the piston skirt 6 and to bond such bolt 9 to the metallic buffer 3.

Figure 5:
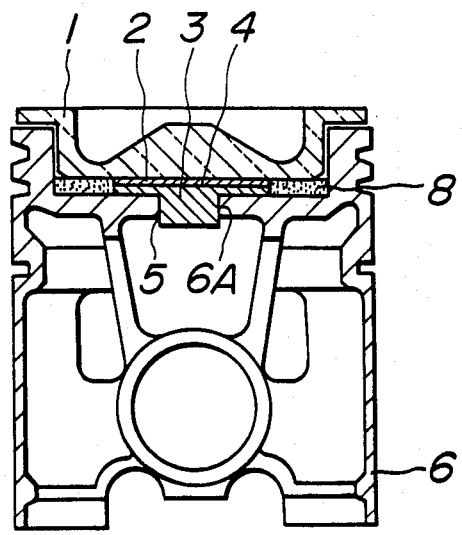

FIG. 5 shows another Diesel engine piston according to the present invention, which uses a boss-and-bore connection between a piston crown 1 and a piston skirt 6. A ceramic piston crown 1 has a metallized layer 2 formed on the bottom surface thereof, and a metallic buffer 3 with a downward projection is bonded to the metallized layer 2 while forming a junction 4 therebetween. A piston skirt 6 has a bore 6A perforated through a top wall thereof, so as to receive the boss of the metallic buffer 3, while forming a junction 5 therebetween. The piston skirt 6 is integrally bonded to the piston crown 1 by the junction 4 between the metallized layer 2 and the metallic buffer 3 and the other junction 5 between the metallic buffer 3 and the piston skirt 6. The junction 5 between the piston skirt 6 and the metallic buffer 3 may be formed either throughout the entire span of the contact surface therebetween, or only at a selected portion of the contact surface. The bonding of the piston skirt 6 to the boss of the metallic buffer 3 may be effected by welding, brazing, or shrink fitting. A suitable heat-insulating material sheet 8 may be inserted in the vacant space between the piston crown 1 and the piston skirt 6, as shown in the figure.

Figure 6:
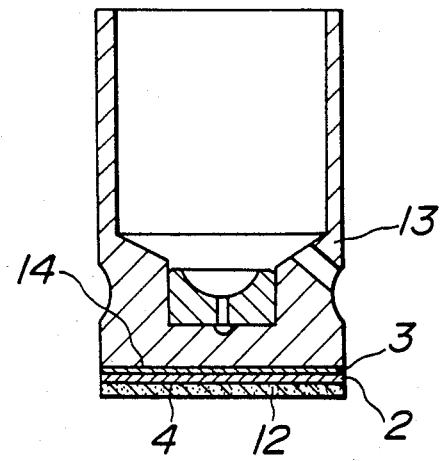
FIG. 6 is a schematic vertical sectional view of a tappet, as another example of the engine part according to the present invention.

FIG. 6 shows a tappet as an embodiment of the present invention. A disk-like cam contact surface member 12 made of ceramics has a metallized layer 2 formed on one side surface thereof. The cam contact surface member 12 is bonded to a tappet body 13 with a metallic buffer 3 inserted there between, so that the surface member 12 is integrally bonded to the tappet body 13 by the junction 4 between the metallized layer 2 and the metallic buffer 3 and another junction 14 between the metallic buffer 3 and the tappet body 13.

The invention will be described in further detail now by referring to examples.

EXAMPLE 1

A disk with a diameter of 70 mm and a thickness of 3 mm was prepared by using a partially stabilized zirconia ceramic containing 5.2% by weight of yttria ($Y_2O_3$). A metallizing paste containing a composition consisting of 75% by weight of molybdenum (Mo), 10% by weight of manganese (Mn), 10% by weight of silica ($SiO_2$), and 5% by weight of alumina ($Al_2O_3$) was spread on the disk so as to form a 0.1 mm thick film of the paste thereon. A metallized layer was formed on the disk from the film by drying it at 90° C. for 1 hour, and heating it at 1,300° C. for 10 hours in a hydrogen-nitrogen mixture atmosphere, which hydrogen and nitrogen were fed through a water vessel heated at 40° C. This metallized layer contained 0.5–1.5% by weight of yttria ($Y_2O_3$) diffused from the zirconia ceramics.

A piston with a diameter of 70 mm and a height of 69 mm as shown in FIG. 1 was produced by assembling the zirconia ceramics disk with the metallized layer thus formed and a piston skirt made of spheroidal graphite cast iron, while inserting a metallic titanium (Ti) disk with a diameter of 70 mm and a thickness of 1 mm. The bonding of the ceramics disk, the piston skirt, and the titanium disk was effected by silver-copper alloy brazing in vacuo.

For reference, another piston of similar dimensions was prepared by directly silver-copper alloy brazing a metallized layer formed thereon to a similar piston skirt made of spheroidal graphite cast iron, without using any metallic titanium disk.

The piston of the invention and the reference piston were tested by using a Diesel engine having a cylinder diameter of 70 mm, a piston stroke of 75 mm, and a revolving speed of 2,200 revolutions per minute (rpm). The maximum brake mean effective pressure which broke the zirconia ceramics disk bonded to the top of the piston was measured. In the case of the piston according to the present invention, the zirconia ceramics disk withstood a brake mean effective pressure of 14 kg/cm$^2$ without having any irregularities caused thereon. On the other hand, in the case of the reference piston, the maximum brake mean effective pressure which caused its breakage was 8.5 kg/cm$^2$.

Thus, the piston according to the present invention proved to be able of operate satisfactorily at a high brake mean effective pressure.

In addition, the bonding strength of the metallized layer and the metallic titanium disk was checked, by preparing two sample disks: namely, a zirconia ceramics disk with a diameter of 7.5 mm and a thickness of 5 mm and having metallized layers formed on opposite surfaces thereof, the metallized layer consisting of 72% by weight of molybdenum (Mo), 12% by weight of manganese oxide (MnO), 8% by weight of silica ($SiO_2$), 5% by weight of alumina ($Al_2O_3$), and 3% by weight of yttria ($Y_2O_3$); and another sample having metallized layers formed on opposite surfaces thereof, the metallized layer consisting of 85% by weight of molybdenum (Mo), 7% by weight of manganese oxide (MnO), 5% by weight of silica ($SiO_2$), 2.5% by weight of alumina ($Al_2O_3$), and 0.5% by weight of yttria ($Y_2O_3$). A round titanium rod with a diameter of 7.5 mm and a length of 35 mm was brazed to each of the opposite surfaces of the sample disks by silver-copper brazing alloy, and the sample disks with the rods were machined into bar-shaped test pieces with a diameter of 6.7 mm. The bonding strength of the test pieces was measured by carrying out tensile tests in accordance with the Japanese Industrial Standard JIS Z2241 "Method of Tensile Test for Metallic Materials". The result showed that the bonding strength of the two samples were 12 kg/mm$^2$ and 15 kg/mm$^2$, respectively.

EXAMPLE 2

A piston crown of the shape as shown in FIG. 2, having a top diameter A of 138.7 mm, a bottom diameter B of 107.0 mm, and a height C of 24.4 mm was prepared by using partially stabilized zirconia ceramics containing 5.2% by weight of yttria ($Y_2O_3$).

A metallizing paste containing a composition consisting of 70% by weight of molybdenum (Mo), 10% by weight of manganese (Mn), 10% by weight of silica ($SiO_2$), 5% by weight of alumina ($Al_2O_3$), 4.7% by weight of zirconia ($ZrO_2$), and 0.3% by weight of yttria ($Y_2O_3$) was spread on the bottom surface of the piston crown, so as to form a film of the paste on the bottom surface. A metallized layer 2 was formed from the film by drying it through heating at 90° C. for 1 hour, and heating it at 1,300° C. for 10 hours in a hydrogen-nitrogen mixture atmosphere, which hydrogen and nitrogen were fed through a water vessel heated at 35° C. A piston skirt with an outside diameter of 139.7 mm and a height of 139.5 mm, which a piston skirt had a top recess of a diameter 107.7 mm and a depth of 23.3 mm, was prepared by using spheroidal graphite cast iron. A cylindrical stub of a diameter of 50 mm and a height of 0.5 mm was formed on the central portion of the bottom of the recess so as to extend upright. The top surface of the cylindrical stub and the surface of the metallized layer on the bottom of the piston crown were nickel plated. The piston crown and the piston skirt were coupled with a metallic titanium disk inserted therebetween, which metallic titanium disk had a diameter of 100 mm and a thickness of 3 mm. A piston as shown in FIG. 2 was produced by brazing the thus coupled piston crown and the piston skirt in vacuo. The piston thus produced had a very strong bond between the piston crown and the piston skirt.

On the other hand, a reference piston was formed by directly brazing the cylindrical stub, which was formed in the recess at the top of the piston skirt, to the metallized layer on the bottom surface of the piston crown, without inserting any metallic titanium disk therebetween. The piston crown of the piston thus brazed broke when the piston was cooled after the brazing.

As described in the foregoing, in an engine part according to the present invention, a ceramic member and a metallic member having different coefficients of thermal expansion are bonded by forming a metallized layer on the surface of the ceramic member and inserting a metallic buffer therebetween, so as to bond the metallic buffer to both the metallized layer of the ceramics member and the metallic member, whereby very strong bond between the two members can be obtained regardless of the shapes of the two members.

Especially, an engine piston having excellent heat-insulating characteristics can be easily produced by the present invention, because the ceramic piston crown having a metallized layer formed on the bottom surface thereof facilitates the strong bond of the metallic piston skirt to the piston crown with the metallic buffer inserted therebetween, which metallic buffer is bonded to both the metallized layer and the metallic member in such a manner that, when the piston is used in an engine, only the ceramic member having a high heat-insulation and a high heat resistance is exposed to the high temperature combustion gas.

Additionally, a tappet with an outstanding wear resistance can be easily produced by using the engine part of the present invention, as in the case of the above-mentioned heat-insulating piston, because one can select a suitable combination of the cam contact surface, the metallized layer, and the shape and structures of the junctions or bond for the operation of the tappet. In other words, a tappet can be constructed similarly to the pistons discussed in Examples 1 and 2 herein, whereby a similar metallic buffer disk can be used. Thus, the engine part of the invention fully utilizes the broad variety of characteristics which are particular to both the ceramic member and the metallic member thereof.

More particularly, with the engine part of the invention, various properties of the ceramic member, such as high heat resistance, high heat-insulation, excellent corrosion resistance, and outstanding wear resistance can be effectively used not only as a piston and a tappet but also as an intake valve, an exhaust valve, a turbocharger, a rocker arm, a cam, and a number of other engine parts exposed to high temperatures and repeated and impulsive loads. Thus, the invention contributes greatly to the industry.

Although the invention has been described with a certain degree of particularity, it is understood that the present disclosure has been made only by way of example and that numerous changes in details of construction and the combination and arrangement of constituent elements may be resorted to without departing from the scope of the invention as hereinafter claimed.

What is claimed is:

1. A piston for an internal combustion engine comprising a metallic piston, a ceramic piston crown, a metallized layer formed on one side of said ceramic piston crown, a plated layer applied to said metallized layer, a metallic buffer disk having an effective thickness for reducing thermal stresses between said metallic piston and said piston crown, said metallic buffer disk being bonded to said metallic plated layer, said metallic buffer disk having a coefficient of thermal expansion which is equivalent to or smaller than that of the ceramic piston crown, whereby said metallic piston is integrally joined to the ceramic piston crown with the metallic buffer disk, the plated layer and the metallized layer disposed therebetween.

2. A piston for an internal combustion engine as set forth in claim 1, wherein a joint between the metallic buffer disk and the metallic piston is a brazed portion.

3. A piston for an internal combustion engine as set forth in claim 1, wherein a joint between the metallic buffer disk and the metallic piston is a diffusion bonded portion.

4. A piston for an internal combustion engine as set forth in claim 1, wherein a joint between the metallic buffer disk and the metallic piston is a welded portion.

5. A piston for an internal combustion engine as set forth in claim 1, wherein a joint between the metallic buffer disk and the metallic piston is an insert cast portion.

6. A piston for an internal combustion engine as set forth in claim 1, wherein a joint between the metallic buffer disk and the metallic piston is a bolted portion.

7. A piston for an internal combustion engine as set forth in claim 1, wherein the ceramic piston crown is made of zirconia ceramics and the metallic piston is made of cast iron.

8. A piston for an internal combustion engine as set forth in claim 1, wherein the metallic buffer disk has a coefficient of thermal expansion which is smaller than $14 \times 10^{-6} (°C.^{-1})$ and the metallic buffer disk comprises a material selected from the group consisting of titanium, titanium alloys, ferritic stainless steel, iron-chromium-nickel alloys, and iron-nickel alloys.

9. A piston for an internal combustion engine as set forth in claim 1, wherein an area of bonding between the metallic buffer disk and the plated layer applied to the metallized layer is larger than an area of bonding between the metallic buffer and the metallic piston.

10. A piston for an internal combustion engine as set forth in claim 1, wherein the metallic buffer disk comprises a material selected from the group consisting of titanium and titanium alloys, and the ceramic piston crown comprises zirconia ceramics.

11. A tappet for an internal combustion engine comprising:
   a tappet body;
   a ceramic member for contacting with a cam as a contact surface;
   a metallized layer bonded to said ceramic member;
   a plated layer applied to said metallized layer;
   a metallic buffer disk having an effective thickness for reducing thermal stresses between said tappet body and said ceramic member, said metallic buffer disk being bonded to said plated layer, said metallic buffer disk having a coefficient of thermal expansion which is equivalent to or smaller than that of the ceramic member; and
   said tappet body is integrally joined to said ceramic member with the metallic buffer disk, the plated layer, and the metallized layer disposed therebetween.

12. A tappet for an internal combustion engine as set forth in claim 11, wherein the metallic buffer disk has a coefficient of thermal expansion which is smaller than $14 \times 10^{-6} (°C.^{-1})$ and the metallic buffer disk comprises a material selected from the group consisting of titanium, titanium alloys, ferritic stainless steel, iron-chromium-nickel alloys, and iron-nickel alloys.

13. A tappet for an internal combustion engine as set forth in claim 11, wherein the metallic buffer disk comprises a material selected from the group consisting of titanium and titanium alloys, and the ceramic member comprises zirconia ceramics.

14. A tappet for an internal combustion engine comprising:
   a zirconia ceramic member for contacting with a cam as a contact surface;
   a metallized layer bonded to said zirconia ceramic member;
   a plated layer applied to said metallized layer;
   a metallic buffer disk comprising a material selected from the group consisting of titanium and titanium alloys; and
   a tappet body, wherein said tappet body is integrally joined to said ceramic member with the metallic buffer disk, the plated layer, and the metallized layer disposed therebetween.

15. A tappet for an internal combustion engine comprising: a ceramic member for contacting with a cam as a contact surface;
   a metallized layer bonded to said ceramic member;
   a plated layer applied to said metallized layer;
   a metallic buffer disk bonded to said plated layer, said metallic buffer disk having a coefficient of thermal expansion which is smaller than that of the ceramic member; and
   a tappet body wherein said tappet body is integrally joined to said ceramic member with the metallic buffer disk, the plated layer, and the metallized disposed therebetween.

* * * * *